June 5, 1934.  E. B. WESTON  1,961,870
DISPLAY RACK OR STAND
Filed Feb. 19, 1932   2 Sheets-Sheet 1

INVENTOR
Edward B. Weston
BY
HIS ATTORNEY

June 5, 1934.  E. B. WESTON  1,961,870
DISPLAY RACK OR STAND
Filed Feb. 19, 1932  2 Sheets-Sheet 2
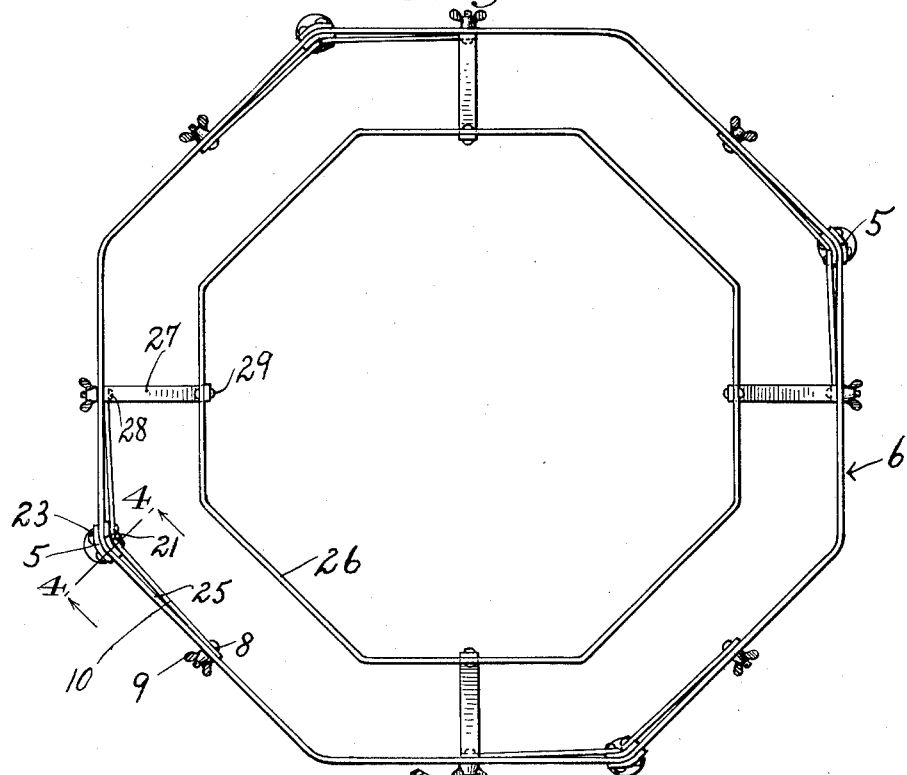
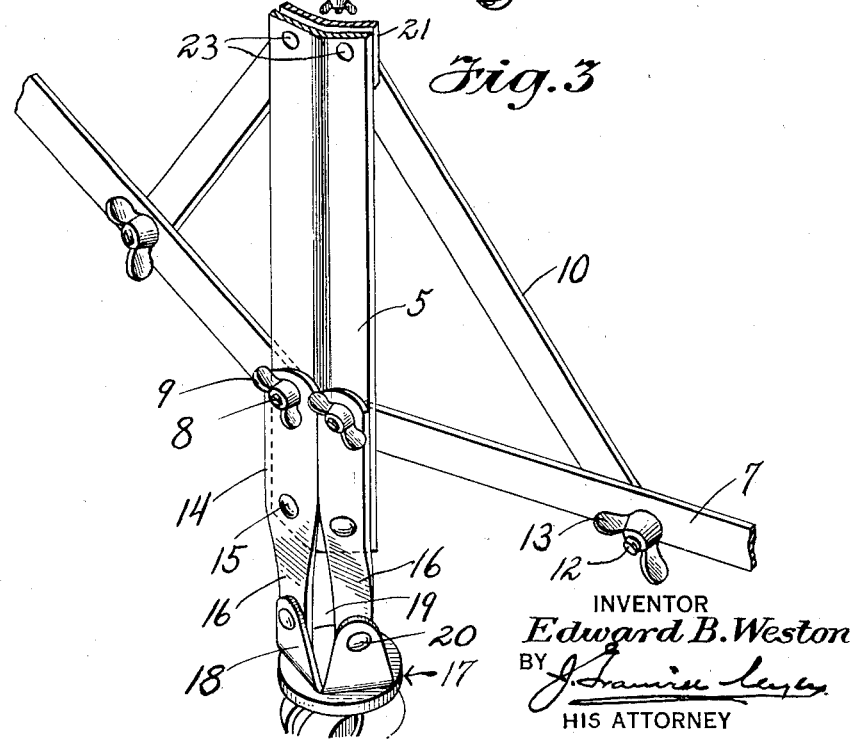
INVENTOR
Edward B. Weston
BY
HIS ATTORNEY Patented June 5, 1934

1,961,870

UNITED STATES PATENT OFFICE 1,961,870

DISPLAY RACK OR STAND

Edward B. Weston, Dayton, Ohio; Wellmore B. Turner and W. G. Clark executors to said Edward B. Weston, deceased Application February 19, 1932, Serial No. 594,113

2 Claims. (Cl. 211—37)

My invention relates to racks or stands of generally open framework character on which articles, such as shoes, can be placed for effective display.

Among the principal general objects of the invention are the provision of a rack or stand of the above type which can be easily manufactured in knock-down form whereby the parts can be compactly packed for shipping and readily assembled to present a strong yet relatively light and attractive display stand capable of supporting a great quantity of merchandise in a small area.

Another important object of the invention is to provide a frame comprising cencentric ring-like members one smaller than and positioned above the other so that shoes can be supported thereon in a manner hereinafter described and affording a display on several sides of the stand or rack.

An important specific object of the invention is to provide a construction and arrangement of parts such that the article supports can be easily and quickly attached to the standards or supports without employing collateral fastening elements, and when positioned on the standards serve as braces to maintain the rack or stand in proper and substantially rigid form.

A rack or stand embodying the invention and the above desirable features may be made in any cross sectional shape either polygonal, oval, circular or rectangular, as will be hereinafter explained.

The foregoing and other objects and advantages of the invention will become apparent and will be pointed out during the course of the following detailed description of the accompanying drawings wherein, for the purposes of illustration, I have shown the invention embodied in a rack or stand for supporting shoes.

In the accompanying drawings:

Fig. 2 is a top plan view of the rack or stand;

Fig. 3 is an enlarged fragmentary perspective view of a portion of the base of the stand.

Figure 1:
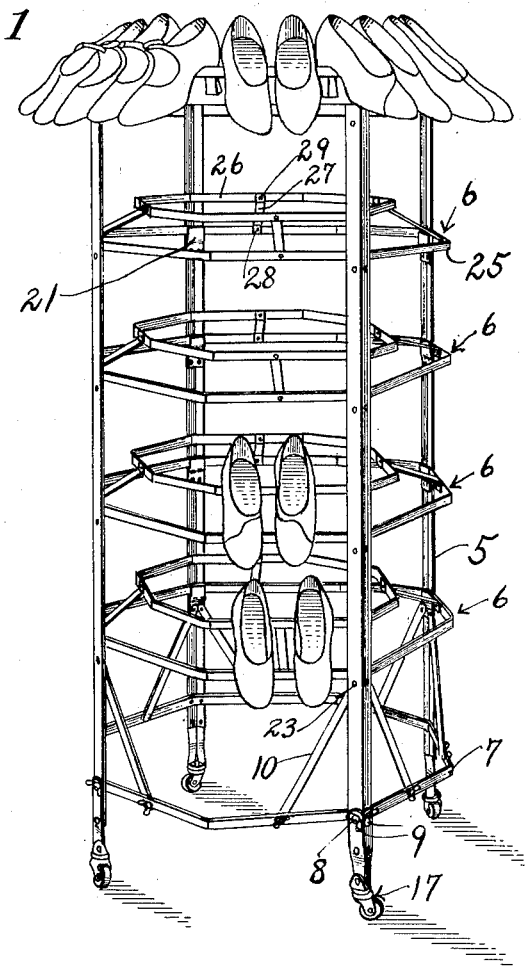
Fig. 1 is a perspective view of a rack or stand embodying the invention and illustrating how shoes may be displayed thereon.

Referring to the drawings in detail, it will be noted that I have illustrated the invention in connection with a rack of octagonal shape wherein the upright legs or supports 5 are of angular formation to receive angles or corners of the frames 6, and the angles or corners of a brace or securing band 7 also of octagonal shape, four angles of which are disposed against the inner side of the supports 5 in face to face relation therewith and secured thereto by screws 8 and wing nuts 9, there preferably being two screws and wing nuts in connection with each leg or support 5. The supports or legs 5 also have secured thereto, preferably in a permanent manner, struts 10, the upper ends of which are disposed preferably on the interior of the supports 5 and pivotally secured thereto by rivets so that the struts can be swung parallel and in line with the surface of the legs 5 and swung outwardly therefrom at their lower ends to bring an opening in the lower end of the struts into registry with an opening in the strips 7 so that screws 12 may be passed through the registering openings to receive a wing nut 13. The legs are thus rigidly connected at the bottom of the stand in proper position to receive the supporting frame 6 as hereinafter described.

Referring to Fig. 3, it will be noted that a pair of plates 14 are secured to the lower ends of the legs 5, each plate 14 lying flush against a face of the leg 5 and being secured thereto by rivets 15 and also having openings through which the screws 8 extend to receive the wing nuts 9. The bottom ends of the plates 14 extend below the ends of the legs 5 and are bent as at 16 to bring the bottom portions of the plates 14 at substantially right angles to each other instead of at the greater angle at which their upper portions are disposed against the legs 5, which greater angle is calculated in the embodiment shown to receive the angles or corners of the octagonal frame 6. The purpose of this construction is to facilitate mounting standard casters such as 17 having upstanding lugs 18 at substantially right angles to each other to the legs so that the stand may be conveniently moved. Although I have described a pair of plates 14, it will be perfectly obvious that I may use a single plate having its upper portion against the legs 5 bent to an angle corresponding to the angles or corners of legs 5 and having its lower portion bifurcated to correspond to the space 19 whereby the portions of the plate below the ends of the legs 5 can be bent at right angles to each other to properly engage with lugs 18 on the casters as above explained so that securing elements such as rivets or screws 20 may be inserted through registering openings in the lugs and depending portions of the plate to secure the casters to the plate and rack. I preferably provide the legs and plates 14 connected and with the casters secured thereto so that the user will not have to assemble the casters on to the rack.

Figure 4:
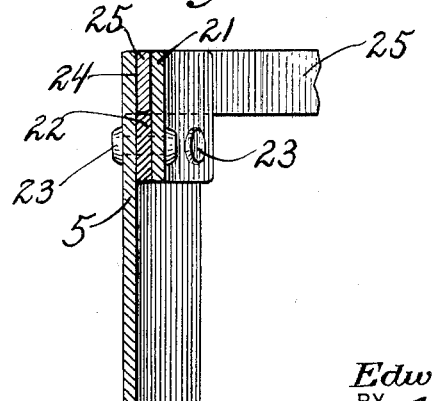
Fig. 4 is a detail sectional view on the line 4—4 of Fig. 2.

As shown in Figs. 1, 2, and 4, the inner surface of each of the legs 5 has secured thereto spaced blocks or short plates 21 conforming to the angle and width of the legs 5. These plates 21 are mounted on each of the legs at corresponding points from the ends of the legs so that when the legs are secured in the position shown in Fig. 1 by the strip 7 and struts 10 the plates 21 will be substantially in horizontal alinement. The plates 21 may be spaced from the legs 5 by inserts 22, through which and the legs and plates 21 are inserted securing elements such as rivets or bolts 23. When the plates 21 are thus secured to the legs 5 there is a space 24 between each of the plates 21 and the legs 5 corresponding substantially in depth and width to the height and thickness of the lower band 25 of the frames 6, which latter also corresponds to the octagonal shape of the securing band 7 so that four of its angles may be readily placed in the spaces 24. Under such an arrangement or mounting it is not necessary to have auxiliary fastening elements to hold the frames in proper position on the supports.

By utilizing the rivets 23 to pivotally secure the upper ends of struts 10 in position as shown in Figs. 1-3 a saving in material and labor can be effected but it is possible to pivot the struts on the legs by separate rivets.

Where the invention is to be used for the display of shoes, I provide in connection with each of the frames 6, another ring-like member 26 of the same shape as the member 25 but of less diameter and mount the member 26 above and concentric with the band 25 by means of strips 27, the lower ends of which are disposed flush against the inner face of the members 25 and are secured thereto as by rivets 28 with the upper ends of said strip flush against the inner face of the members 26 and secured thereto as by rivets 29. The intermediate portions of the strips 27 extend diagonally between the ring-like members 25 and 26. The distance and relative angle between the bands 25 and 26 is preferably and substantially as shown in Fig. 1 so that the heels of shoes may be engaged over and behind the members 26, while the soles of the shoes will rest against the larger member 25 with the shoes in inclined position.

There may be any number of frames 6 thus secured and mounted on the legs 5 to provide tiers, each capable of holding and displaying shoes in the manner shown in Fig. 1 wherein the shoes can be arranged in pairs on the straight portions of the frame 6 between the angles or corners all the way around the rack so that they are visible from all points in a room.

The stand may be conveniently packed and shipped by nesting the frames 6 and strips 7 in obvious manner to compact form. The struts 10 are swung in on their pivots flush with and in alinement with the faces of the legs 5, and the legs with the struts thus positioned are also compactly packed for shipment. When the purchaser receives the rack he simply places the legs 5 against the angles of the strip 7 so that the openings for the reception of the screws 8 register after which he inserts the screws through the openings and applies the wing nuts 9. This is done quickly and with no need or study or skill on the part of the user and when the four legs have thus been secured to the band 7 he can stand the rack up on the casters, swing the struts 10 out on their pivots until the openings in their lower ends register with the openings in the band 7 and then insert screws 12 and apply the wing nuts 13. The legs are now substantially rigidly secured in proper position for insertion of the frames 6 and the user simply places any four angles of each band 25 into the respective spaces 24. The number of frames 6 is immaterial but it is preferable to have one at or adjacent the top of the stand to properly space the upper ends of legs 5 and to maintain the upper portion of the rack substantially rigid. When the parts have been thus assembled the shoes can be attractively displayed by placing them in the manner above described.

I have mentioned that the particular configuration or shape of the rack shown is merely illustrative and it should be perfectly obvious that racks embodying the invention can be made circular or oval shaped or rectangular without departing from the features of construction shown and described.

I deem it within the scope of the invention to apply the features above described and shown to various types of display racks whether they are especially designed to receive and display shoes or for other purposes.

What I claim is:

1. A rack or stand comprising a plurality of legs, a member detachably connecting the legs adjacent their lower ends in spaced relation to each other, struts connected to the legs and swingable into the plane of the legs and swingable at one end outwardly from the legs over said member, means for detachably connecting said ends of the struts to the member to rigidly hold the legs in fixed spaced relation at their lower ends, and an article display frame detachably supported adjacent the upper ends of the legs and maintaining the upper portion of the stand or rack in substantially rigid condition, said frame including a pair of similarly shaped ring-like members of different diameter, the smaller one being on a plane above the larger one.

2. A knockdown rack or stand comprising a plurality of vertical spaced-apart legs, an annular frame removably connected to the legs adjacent their lower ends and holding the said lower ends of the legs in fixed spaced relation, a plurality of clips on each leg at correspondingly spaced intervals along its length, a plurality of removable article supporting frames located one above the other between the legs and each comprising a pair of concentric spaced ring-like members one of greater diameter than the other and held in fixed spaced relation with the smaller one above the larger, said larger ring-like members of the frames being detachably connected to the legs by said clips, whereby said frames are arranged in spaced superposed relation so that shoes may be displayed in superposed annular spaced rows on said frames by engagement of the heels behind the smaller ring-like members with the soles resting on the larger ring-like members in the spaces between the said legs, and one of said frames rigidly holding the upper portions of the legs in fixed spaced relation.

EDWARD B. WESTON.